Jan. 19, 1965 I. ROBERTS 3,166,328

MAGNETIC TAPE RECORDING AND PLAYBACK SYSTEMS

Filed July 25, 1962

INVENTOR
IRVING ROBERTS

BY J. Rupert Baker
ATTORNEY

United States Patent Office 3,166,328
Patented Jan. 19, 1965

3,166,328

MAGNETIC TAPE RECORDING AND PLAYBACK SYSTEMS

Irving Roberts, 182—18 Henley Road, Jamaica, N.Y.

Filed July 25, 1962, Ser. No. 212,365
6 Claims. (Cl. 274—4)

Figures 1, 2:
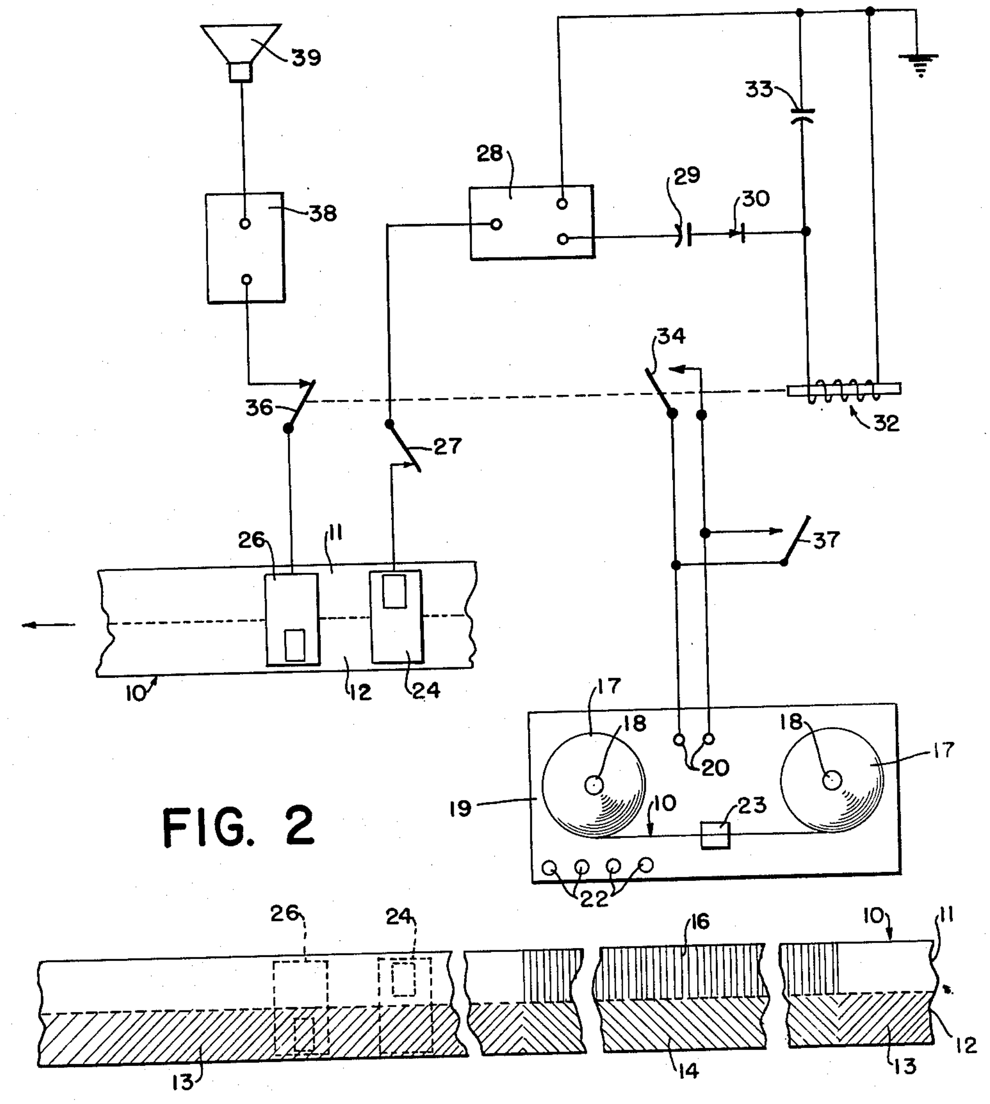

The present invention relates generally to improvements in recording and playback systems and apparatus, and it relates more particularly to an improved system and apparatus for recording information and for automatically playing back selected portions of said information while bypassing other portions thereof.

It has long been a conventional practice to record on magnetic tape a single and related sequence such as narratives, musical and non-musical plays, lectures, various types of lessons and instructions and other types of entertainment and information in their substantially full versions or in complete lengthy detail. It follows that to play back long recordings of the above type is generally highly time consuming. It is frequently desirable to listen to a condensation of the recorded information or to only pre-selected portions or passages thereof. The conventional magnetic tape playback apparatus is provided with a tape drive which selectively advances the tape at its normal playback speed or rapidly advances the tape at a rate many times that of the normal playback speed. Frequently the playback operator and listener, after the playing of a particular portion or passage of the recorded sequence, desires to skip or bypass a following passage or portion and continue the playback of the tape at a much later part thereof. This is done by switching the playback device to rapid advance following the playing of a passage and then returning it to normal advance at the beginning of the desired passage. This is at best a tedious hit and miss process which possesses many drawbacks and disadvantages. Even with tape metering devices and a knowledge of the location of the desired passages, the chances of stopping the tape rapid advance at the correct point is extremely unlikely thereby necessitating the hunting by the operator until the desired passage is reached. This procedure is, of course, highly inconvenient and untenable since the listener will generally be unaware of the make-up of the narrative or other sequence.

It is thus a principal object of the present invention to provide an improved information recording and playback system.

Another object of the present invention is to provide an improved magnetic tape recording and playback system and apparatus.

Still another object of the present invention is to provide an improved magnetic tape recording and playback system in which selected portions or passages of a recording may be automatically played back, the remaining portions being rapidly bypassed.

A further object of the present invention is to provide a recording and playback system and apparatus of the above nature characterized by its versatility, reliability, simplicity, use of standard equipment and low cost.

The above and other objects of the present invention will become apparent from a reading of the following description taken in conjunction with the accompanying drawing wherein:

FIGURE 1 is a schematic and block diagram of an apparatus embodying the present invention; and FIGURE 2 is a fragmentary view of a section of recorded magnetic tape in accordance with the present invention.

In a sense, the present invention contemplates the provision of a magnetic tape playback system comprising a magnetic tape, carrying a continuously related sequence of information recorded at a first relatively slow normal speed, a control signal carried by said tape delineating preselected first portions and second portions of said information, means selectively advancing said tape at said normal speed, and at a relatively rapid speed, and means responsive to said control signal alternatively advancing said tape at said normal and at said rapid speed, whereby to play back said first information portions at said normal speed, and rapidly bypass said second portions.

Another feature resides in the recorded magnetic tape which includes selected first and second recorded passages and recorded signals coextensive with and delineating said passages.

In accordance with a preferred form of the present improved apparatus, the magnetic tape drive mechanism is a conventional tape deck provided with a switch operated rapid and normal playback advance control means. The tape is of the dual or multiple track type, carrying the recorded information comprising successive passages on one track and an audio signal on another track, the audio signal being coextensive with selected passages of the tape depending on whether they are to be played back or bypassed. At first playback head registers with the tape first track and is connected through an audio amplifier to a loud speaker and a second pickup head registers with the second track and controls the tape deck by way of an amplifier and relay so as to normally or rapidly advance the tape in response to the presence or absence of the signal. Also controlled by the second pickup head is the audio amplifier network so as to disable the latter during the tape rapid advance.

Referring now to the drawings which illustrate a preferred embodiment of the present invention, the reference numeral 10 generally designates a magnetic recording tape of any well known type which is recorded along upper and lower tracks 11 and 12 respectively. The desired information is recorded on the lower track 12 and, as aforesaid, may be in the form of a narrative, lecture, play, musical composition or the like and includes successive related passages or portions 13 and 14. The passages 13 are those which it may be desired to play back to the exclusion of the passages 14. Recorded on the tape upper track 11 is a signal recording 16 which may be an audio signal and extends substantially coextensively with the passages 14 and is absent along the length of the passages 13. It should be noted that the trailing ends of the signal sequences 16 may trail those of the passages 14 to allow for the overrunning inertia of the playback apparatus. While the signal 16 is advantageously a magnetic recording in the audio range on the track 11 spaced from the information carrying track 12, it may be at other frequencies, it may be of a physical, electrical or optical nature, and may be carried on the track 12 if it does not interfere with the recording thereon. Where these other signal means are provided instead of a magnetic pickup head, other transducing means are employed which respond to the corresponding signal.

The tape 10 is wound upon and extends between a pair of reels 17 which are mounted on spindles 18 associated with a conventional magnetic tape deck 19. The tape deck 19 includes the usual spindle drive and tape advancing means and is provided with a pair of terminals 20 the shunting of which actuates the deck to tape rapid advance drive. The usual control knobs 22 are also associated with the deck 19, one of said knobs effecting the deck motivation to tape normal advance, said advance being switched to rapid advance by the shunting of the terminals 20.

Mounted on the deck 19 is a tape guide and pickup assembly 23 which includes a pair of magnetic playback heads 24 and 26 respectively, the head 24 being magnetically coupled to the upper track 11 and the head 26 being magnetically coupled to the lowest track 13 of a magnetic tape 11 carried by the deck 19 and travelling through the assembly 23. The magnetic pickup 24 is connected through a manually controlled switch 27 to the input of an amplifier. The output of the amplifier 28 is connected through the series connected capacitor 29 and diode 30 to a relay solenoid 32, the solenoid 32 being shunted by a capacitor 33. Motivated by the solenoid 32 are a normally open relay switch 34 and a normally closed relay switch 36.

The relay switch 34 is connected across the tape speed control terminals 20 and is shunted by a manually actuatable switch 37. The magnetic pickup head 26 is connected through the relay switch 36 to the input of an audio amplifier 38 the output of which is coupled to a loud speaker 39.

Considering now the operation of the system described above, under normal automatic operation the circuit is in the condition illustrated in the drawing. The pickup head 24 in the aforesaid condition registers with a section of the track 11 which carries no signal and is coextensive with a passage 13. No signal being fed to the amplifier 28 the solenoid 32 is deenergized so that switches 34 and 36 are open and closed respectively, the tape 10 being advanced at its normal playback speed and the passage 13 being played through the speaker 39. When the passage 14 reaches the pickup 26, the signal section 16 reaches the pickup 24 and the signal amplified by the amplifier 28 energizes the relay solenoid 32 to close and open the relay switches 34 and 36 respectively. The closing of the switch 34 shunts the terminals 20 to actuate the deck 19 to rapidly advance the tape 10 and opening of switch 36 disables the audio playback circuit and silences the same during rapid advance. Thus, the passages 14 are rapidly automatically bypassed and are inaudible or substantially so. When the next successive passage 14 reaches the pickup 26, the signal section 16 passes the pickup 24 to effect deenergization of the relay solenoid 32 and the return of the apparatus to its original playback condition. The passages 13 and 14 may both be played back in the normal manner by merely opening the switch 27 to disable the automatic control network. Moreover, the tape may be selectively rapidly advanced by closing the switch 37.

While there has been described and illustrated a preferred embodiment of the present invention, it is apparent that numerous alterations, omissions and additions may be made without departing from the spirit thereof. For example, while the signal sequences 16 are coextensive with the passages 14, they may, in the alternative, be coextensive with the passages 13 and the relay switches may be actuated in an opposite sense.

What is claimed is:

1. A magnetic tape playback system comprising a magnetic tape carrying a continuously related sequence of information recorded at a first relatively slow normal speed, a control signal carried by said tape and coextensive with preselected portions of said information, means selectively advancing said tape at said normal speed, and at a relatively rapid speed, and means responsive to said control signal alternatively advancing said tape at said normal and at said rapid speed, whereby to play back and rapidly bypass alternate successive portions of said recorded information as delineated by said control signal.

2. The system of claim 1 wherein said control signal is magnetically recorded on said tape and said signal response means includes a magnetic pickup coupled to said tape.

3. The system of claim 1 including an audio playback network having an input coupled to said tape, and means responsive to said control signal for concurrently disabling said network during the rapid advance of said tape.

4. A magnetic playback system comprising a multiple track magnetic tape having magnetically recorded on a first of said tracks information divided into a plurality of successive alternate first and second passages of a continuously related sequence and on a second of said tracks a signal substantially coextensive with alternate corresponding passages, first and second pickups coupled to said first and second tracks respectively, means selectively advancing said tape at a relatively slow normal playback speed and at a relatively rapid speed, an audio playback circuit connected to said first pickup and means coupled to said second pickup and responsive to the signal thereto controlling said tape advance speed, to advance said tape along said first and second passages at normal playback and rapid speeds respectively.

5. The playback system of claim 4 wherein said control signal is of an audio frequency.

6. The playback system of claim 4 including means disabling said audio playback network during the rapid advance of said tape.

References Cited by the Examiner

UNITED STATES PATENTS

| | | | |
|---|---|---|---|
| 2,295,000 | 9/42 | Morse | 274—43 |
| 2,396,409 | 3/46 | Berzer | 274—4 |
| 2,558,853 | 7/51 | Kappeler | 179—100.2 |
| 2,797,611 | 7/57 | Anthony | 274—4 |

NORTON ANSHER, *Primary Examiner.*